(12) United States Patent
Okada

(10) Patent No.: US 11,308,980 B2
(45) Date of Patent: Apr. 19, 2022

(54) DISK DEVICE WITH MAGNETIC RECORDING MEDIA AND IMPROVED IMPACT RESISTANCE

(71) Applicants: KABUSHIKI KAISHA TOSHIBA, Tokyo (JP); TOSHIBA ELECTRONIC DEVICES & STORAGE CORPORATION, Tokyo (JP)

(72) Inventor: Mio Okada, Kanagawa (JP)

(73) Assignees: KABUSHIKI KAISHA TOSHIBA, Tokyo (JP); TOSHIBA ELECTRONIC DEVICES & STORAGE CORPORATION, Tokyo (JP)

( * ) Notice: Subject to any disclaimer, the term of this patent is extended or adjusted under 35 U.S.C. 154(b) by 0 days.

(21) Appl. No.: 17/190,791

(22) Filed: Mar. 3, 2021

(65) Prior Publication Data
US 2022/0059126 A1 Feb. 24, 2022

(30) Foreign Application Priority Data
Aug. 18, 2020 (JP) .............................. JP2020-138035

(51) Int. Cl.
*G11B 17/02* (2006.01)
*G11B 5/73* (2006.01)
*G11B 5/012* (2006.01)
*G11B 5/82* (2006.01)
*G11B 25/04* (2006.01)

(52) U.S. Cl.
CPC .......... *G11B 5/012* (2013.01); *G11B 5/73919* (2019.05); *G11B 5/73921* (2019.05); *G11B 5/82* (2013.01); *G11B 17/021* (2013.01); *G11B 25/043* (2013.01); *G11B 2220/2516* (2013.01)

(58) Field of Classification Search
None
See application file for complete search history.

(56) References Cited

U.S. PATENT DOCUMENTS

| 5,629,820 | A | * | 5/1997 | Koriyama | ............ | G11B 5/4826 |
|---|---|---|---|---|---|---|
| | | | | | | 360/244.2 |
| 5,838,516 | A | * | 11/1998 | Staggers | ............ | G11B 23/0035 |
| | | | | | | 360/98.08 |

(Continued)

FOREIGN PATENT DOCUMENTS

JP H05-114268 A 5/1993

*Primary Examiner* — Jefferson A Evans
(74) *Attorney, Agent, or Firm* — Kim & Stewart LLP (57) ABSTRACT

According to one embodiment, a disk device includes a housing, a plurality of magnetic recording media disposed in the housing in a multi-layered manner with intervals therebetween and a plurality of spacer rings, one of the spacer rings being disposed between each adjacent pair of the magnetic recording media. At least one of an uppermost magnetic recording medium and a lowermost magnetic recording medium includes a substrate having a rigidity higher than that of substrates of the other magnetic recording media, and one or more of the plurality of spacer rings is in contact with the magnetic recording media including the substrate having the higher rigidity, and has a thermal expansion coefficient different from a thermal expansion coefficient of the other spacer rings.

9 Claims, 6 Drawing Sheets

(56) References Cited

U.S. PATENT DOCUMENTS

| | | | | |
|---|---|---|---|---|
| 5,886,852 | A * | 3/1999 | Kikuchi | G11B 33/1433 |
| | | | | 360/98.08 |
| 6,285,525 | B1 * | 9/2001 | McCutcheon | B32B 27/06 |
| | | | | 360/98.08 |
| 6,791,791 | B1 * | 9/2004 | Alfred | G11B 17/022 |
| | | | | 360/98.08 |
| 7,064,922 | B1 * | 6/2006 | Alfred | G11B 17/022 |
| | | | | 360/98.08 |
| 8,493,820 | B1 * | 7/2013 | Langlais | G11B 25/043 |
| | | | | 369/13.33 |
| 9,019,655 | B1 * | 4/2015 | Johnson | G11B 17/0287 |
| | | | | 360/98.08 |
| 2002/0071205 | A1 * | 6/2002 | Koyanagi | G11B 17/038 |
| | | | | 360/98.08 |
| 2009/0225471 | A1 | 9/2009 | Kamezawa | |
| 2014/0078616 | A1 * | 3/2014 | Aiello | G11B 19/2018 |
| | | | | 360/98.01 |

* cited by examiner

|  | Parts | Materials |
|---|---|---|
| (1) | Medium substrate as base | Aluminum-based |
| (2) | Uppermost and/or lowermost medium substrate | Glass-based |
| (3) | Spacer ring as base | Aluminum-based |
| (4) | Spacer ring(s) adjacent to part(s) of (2) | Stainless steel- or titanium- or glass-based |
| (5) | Motor hub | Aluminum-based |
| (6) | Clamp | Aluminum-based |

FIG. 7

|  | Parts | Materials |
|---|---|---|
| (1) | Medium substrate as base | Aluminum-based (aluminum material 1) |
| (2) | Uppermost and/or lowermost medium substrate | Aluminum-based (aluminum material 2) |
| (3) | Spacer ring as base | Aluminum-based (aluminum material 3) |
| (4) | Spacer ring(s) adjacent to part(s) of (2) | Aluminum-based (aluminum material 4) |
| (5) | Motor hub | Aluminum-based |
| (6) | Clamp | Aluminum-based |

FIG. 8

|  | Parts | Materials |
|---|---|---|
| (1) | Medium substrate as base | Aluminum-based |
| (2) | Uppermost and/or lowermost medium substrate | Glass-based |
| (3) | Spacer ring as base | Aluminum-based |
| (4) | Spacer ring(s) adjacent to part(s) of (2) | Stainless steel- or titanium- or glass-based |
| (5) | Motor hub | Stainless steel-based |
| (6) | Clamp | Stainless steel-based |

FIG. 9

|  | Parts | Materials |
|---|---|---|
| (1) | Medium substrate as base | Glass-based (glass material 1) |
| (2) | Uppermost and/or lowermost medium substrate | Glass-based (glass material 2) |
| (3) | Spacer ring as base | Stainless steel- or titanium- or glass-based (material 3) |
| (4) | Spacer ring(s) adjacent to part(s) of (2) | Stainless steel- or titanium- or glass-based (material 4) |
| (5) | Motor hub | Stainless steel-based |
| (6) | Clamp | Stainless steel-based |

FIG. 10

DISK DEVICE WITH MAGNETIC RECORDING MEDIA AND IMPROVED IMPACT RESISTANCE

CROSS-REFERENCE TO RELATED APPLICATIONS

This application is based upon and claims the benefit of priority from Japanese Patent Application No. 2020-138035, filed Aug. 18, 2020, the entire contents of which are incorporated herein by reference.

FIELD

Embodiments described herein relate generally to a disk device.

BACKGROUND

As disk devices, for example, hard disk devices (HDDs) comprise a plurality of magnetic recording media (magnetic disks) disposed rotatably in a housing, a plurality of magnetic heads which carry out read and write of data with respect to the respective magnetic disks, and a head actuator which supports the magnetic heads movably with respect to the respective magnetic disks.

Recently, disk devices are advanced to have high capacity and therefore the number of magnetic disks is increased and the magnetic disks are made thinner. As the thinning of the magnetic disks advances, the amount of deflection of the magnetic disks, which may occur when the device is subjected to an impact such as dropping, is increased, and therefore there may undesirably raise a trouble as, for example, a ramp or a magnetic head and a magnetic disk are brought into contact with each other.

DETAILED DESCRIPTION

Various embodiments will be described hereinafter with reference to the accompanying drawings. In general, according to one embodiment, a disk device comprises a housing including a bottom wall and a cover opposing the bottom wall, a plurality of magnetic recording media disposed in the housing in a multi-layered manner to be coaxial with each other with intervals therebetween and a plurality of spacer rings each disposed between each adjacent pair of the plurality of magnetic recording media. At least one of an uppermost magnetic recording medium adjacent to the cover and a lowermost magnetic recording medium adjacent to the bottom wall comprises a substrate having a rigidity higher than that of substrates of the other magnetic recording media, and spacer rings brought into contact with the magnetic recording media with the substrate having the higher rigidity have a thermal expansion coefficient different from a thermal expansion coefficient of the other spacer rings.

The disclosure is merely an example, and proper changes in keeping with the spirit of the invention, which are easily conceivable by a person of ordinary skill in the art, come within the scope of the invention as a matter of course. In addition, in some cases, in order to make the description clearer, the widths, thicknesses, shapes and the like, of the respective parts are illustrated schematically in the drawings, rather than as an accurate representation of what is implemented. However, such schematic illustration is merely exemplary, and in no way restricts the interpretation of the invention. In addition, in the specification and drawings, the same elements as those described in connection with preceding drawings are denoted by like reference numbers, and detailed description thereof is omitted unless necessary.

First Embodiment

As a disk device, a hard disk drive (HDD) according to a first embodiment will be described in detail.

Figure 1:
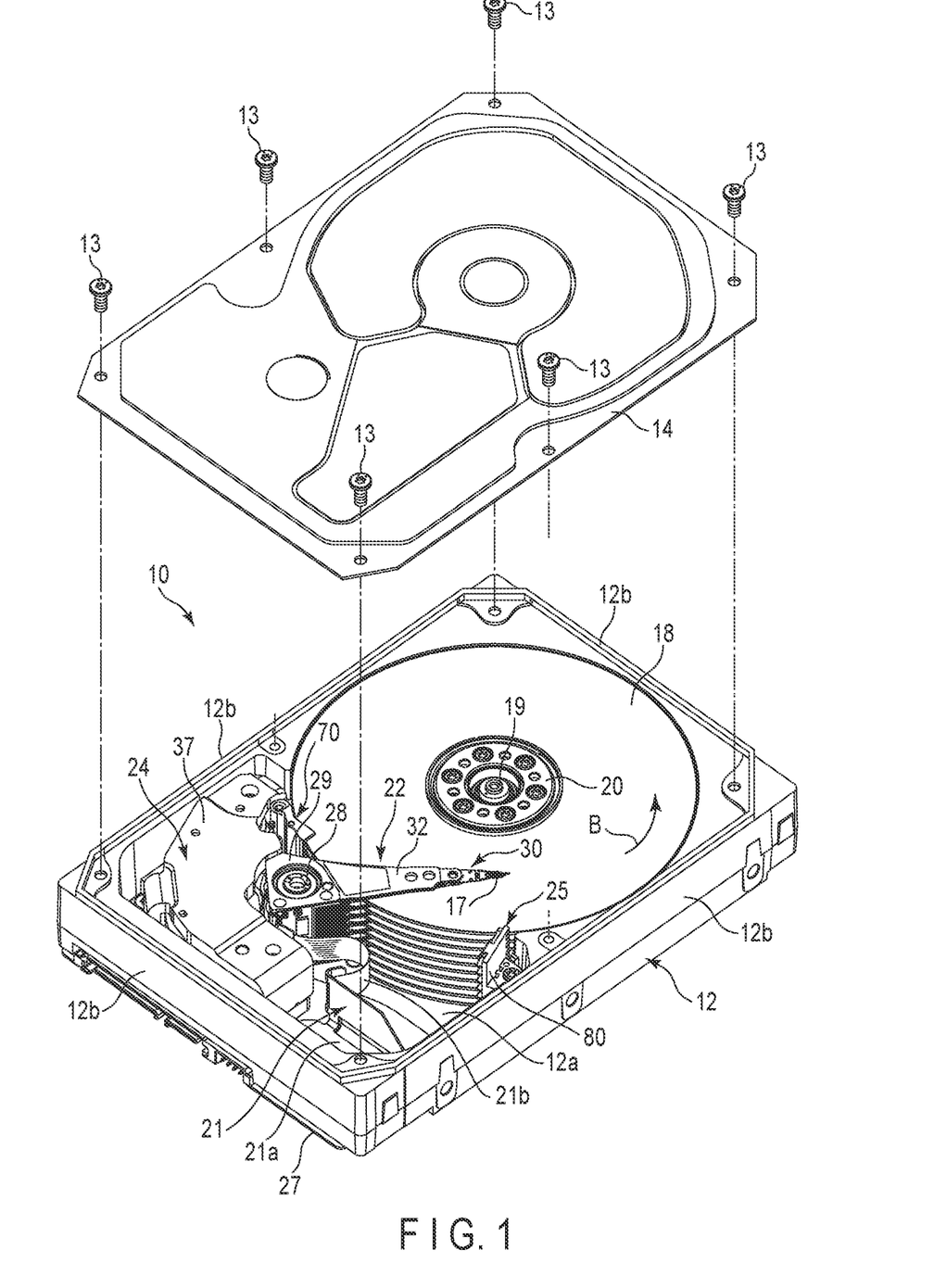
FIG. 1 is an exploded perspective view of a top cover of a hard disk device (HDD) according to a first embodiment.

FIG. 1 is an exploded perspective view showing the HDD according to the embodiment, when a cover is removed.

As shown in FIG. 1, the HDD comprises a rectangular shaped housing 10. The housing 10 includes a rectangular box-shaped base 12 with an upper opening opened and a cover (top cover) 14. The base 12 includes a rectangular bottom wall 12a and side walls 12b formed to stand along edges of the bottom wall 12a, which are formed to be integrated together as one body from, for example, aluminum. The cover 14 is formed, for example, into a rectangular plate shape from stainless steel. The cover 14 is screwed on the side walls 12b of the base 12 with a plurality of screws 13 so as to air-tightly close the upper opening of the base 12.

In the housing 10 are provided a plurality of disk-shaped magnetic recording media, for example, ten magnetic disks 18, and a spindle motor 19 which supports and rotate the magnetic disks 18. The spindle motor 19 is disposed on the bottom wall 12a. The magnetic disks 18 each include a disk-shaped substrate having a diameter of 95 mm (3.5 inches), and magnetic recording layers formed respectively on an upper surface and a lower surface of the substrate. The substrate is formed of a nonmagnetic material, for example, glass or aluminum. The magnetic disks 18 are engaged coaxially each other with a hub of the spindle motor 19, which will be described later, and further clamped by a clamp spring 20. Thus, the ten magnetic disks 18 are disposed coaxially each other in a multi-layered manner with regular intervals therebetween and are supported to be placed parallel to the bottom wall 12a of the base 12. The magnetic disks 18 are rotated in a direction indicated by an arrow B at a predetermined number of revolutions by the spindle motor 19. Note that the number of magnetic disks 18 installed is not limited to ten, but nine or less or 10 or more but twelve or less.

In the housing 10 are provided a plurality of magnetic heads 17 for recording/reproducing data with respect to the magnetic disks 18 and an actuator assembly 22 which supports the magnetic heads 17 to be movable with respect to the magnetic disks 18. The housing 10 further includes a voice coil motor (VCM) 24 which rotates and positions the actuator assembly 22, a ramp load mechanism 25 which hold the magnetic heads 17 at an unload position spaced apart from the respective magnetic disks 18 when the magnetic heads 17 move to the outermost circumference of the magnetic disks 18, a substrate unit (FPC unit) 21 on which electronic components such as a conversion connector are mounted, and a spoiler 70. The ramp load mechanism 25 includes a ramp 80 set on the bottom wall 12a and located in the vicinities of outer circumferential edges of the magnetic disks 18 and a tab, which will be described later, provided in the actuator assembly 2.

To an outer surface of the bottom wall 12a of the base 12, a printed circuit board 27 is fixed by screwing. The printed circuit board 27 constitutes a controller which controls operation of the spindle motor 19 and controls operation of the VCM 24 and the magnetic heads 17 via the substrate unit 21.

The actuator assembly 22 includes an actuator block 29, a plurality of arms 32 each extending from the actuator block 29 in the same direction and head gimbal assemblies (HGA) 30 attached to extending ends of the respective arms 32. The actuator block 29 is rotatably supported to a support shaft (pivot) 28 set to stand on the bottom wall 12a via a unit bearing. Each of the HGAs 30 comprises a suspension (load beam) 26 which extends from the respective arm 32, a flexure (wiring member) 28 (see FIG. 3) disposed on the load beam 26 and the arm 32 and the respective magnetic head 17 mounted on a gimbal portion 41 of the flexure 28.

The head actuator assembly 22 further comprises a support frame (not shown) extending from the actuator block 29 in a direction opposite to that of the arm 32, and a voice coil attached to the support frame. The voice coil is located between a pair of yokes 37 disposed on the bottom wall 12a and constitutes the VCM 24 together with the yokes 37 and a magnet fixed to either one of the yokes 37.

The FPC unit 21 includes a main the main body 21a formed from a flexible printed circuit board, and the main the main body 21a is fixed to the bottom wall 12a of the base 12. Electronic components such as conversion connectors are mounted on the main body 21a. The conversion connectors penetrate the bottom wall 12a and are connected to the printed circuit board 27. The FPC unit 21 includes a relay flexible printed circuit board (to be referred to as relay FPC hereinafter) 21b extending out from the main body 21a. An extending end portion of the relay FPC 21b is attached to a side surface (installation surface) of the actuator block 29. The extending end portion of the relay FPC 21b are electrically connected to the magnetic heads 17 via the flexure 28 described above.

The ramp load mechanism 25 includes a ramp 80 disposed on the bottom wall 12a and located in the vicinities of the outer circumferential edges of the magnetic disks 18 and a tab 35 (see FIG. 3) provided in the distal end of each load beam 26. When the magnetic heads 17 move to the outermost circumference of the respective magnetic disks 18, the tabs 35 of the load beams 26 ride on the ramp 80, and the magnetic heads 17 are held at the unload position spaced from the magnetic disks 18.

Figure 2:
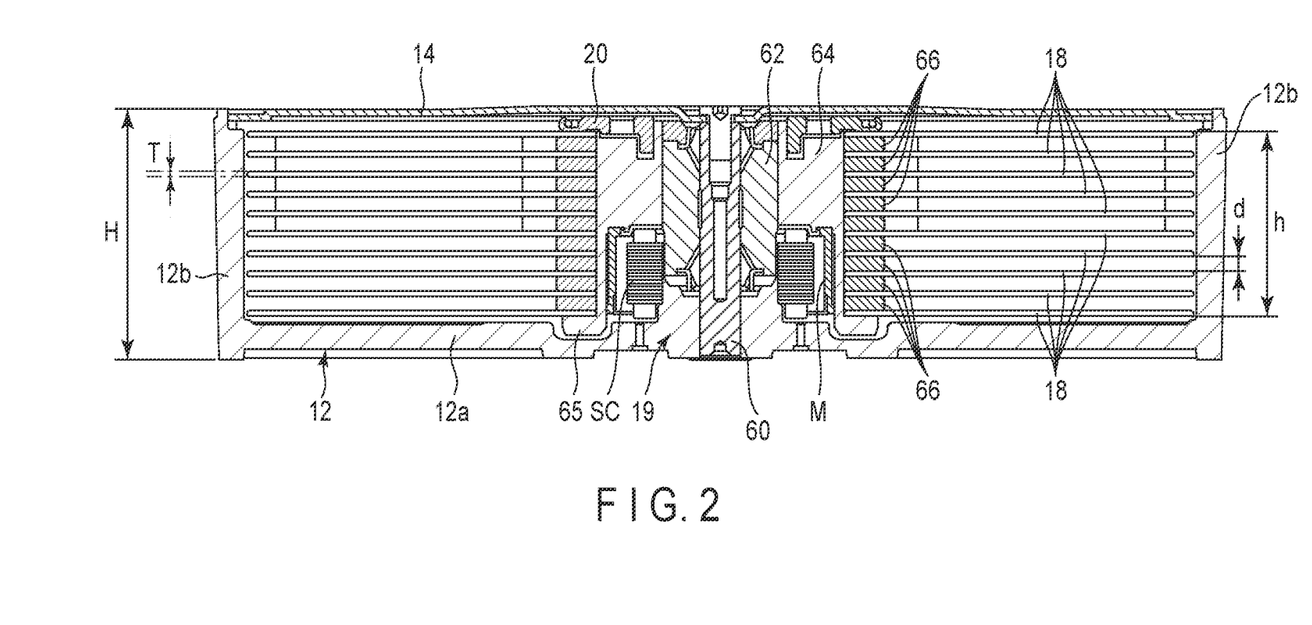
FIG. 2 is a cross-sectional view of the HDD.

FIG. 2 is a cross sectional view of the HDD. As shown, for example, the spindle motor 19 includes a support shaft 60 set to stand substantially perpendicularly on the bottom wall 12a, a cylindrical rotating shaft 62 rotatably supported around the support shaft 60, a substantially cylindrical hub 64 coaxially secured around the rotating shaft 62, a stator coil SC fixed to the bottom wall 12a and disposed around the rotating shaft 62, and further a cylindrical magnet M attached to an inner circumferential surface of the hub 64 so as to oppose the stator coils SC. The hub 64 comprises an outer circumferential surface located coaxial with the support shaft 60 and an annular flange 65 formed to be integrated with a lower end (an end on a bottom wall 12a side) of the outer circumferential surface.

The magnetic disks 18 engage with an outer circumferential surface of the hub 64 while the hub 64 are through an inner hole thereof. Further, an annular spacer ring 66 is mounted on the outer circumferential surface of the hub 64 and is interposed between each adjacent pair of magnetic disks 18. The magnetic disks 18 and the spacer rings 66 are disposed on the flange 65 of the hub 64 in the order, and attached to the hub 64 while they are alternately stacked one on another. The clamp spring 20 attached to an upper end of the hub 64 pushes the inner circumferential portions of the magnetic disks 18 and the spacer rings 66 to a flange 65 side, and thus the magnetic disk 18 are fixed in a multi-layered manner with regular intervals therebetween. The lowermost magnetic disk 18 abuts, by its inner circumferential portion of the lower surface, the against the flange 65 of the hub 64. The clamp spring 20 abuts against an inner circumferential portion of an upper surface of the uppermost magnetic disk 18. With this configuration, the ten magnetic disks 18 are supported parallel to each other with regular intervals therebetween and also substantially parallel to the bottom wall 12a, and also supported to be rotatable integrally with the rotating shaft 62 and the hub 64.

A height (thickness) H of the housing 10 is set to be at a maximum of 26.1 mm or less according to the 3.5-inch HDD standard. A thickness T of the magnetic disks 18 is 0.35 to 0.635 mm and, in this embodiment, it is 0.5 mm. An interval d(, which is equivalent to the thickness of the spacer ring) between each adjacent pair of magnetic disks 18 is set to about 1.2 to 1.5 mm. A stacking height h of all the magnetic disks (a height from the lower surface of the lowermost magnetic disk 18 to the upper surface of the uppermost magnetic disk 18) is, in this embodiment, 18.356 mm.

Figure 3:
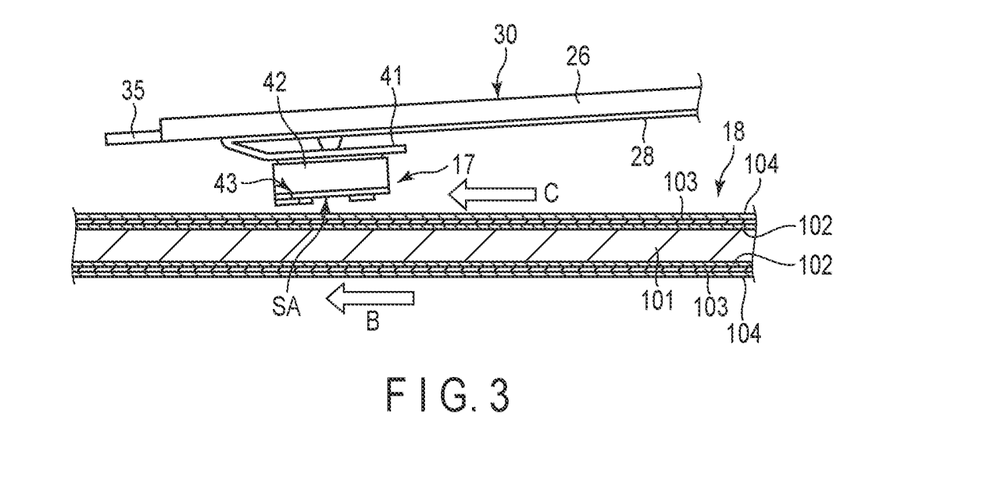
FIG. 3 is an enlarged cross-sectional view of a magnetic head and a magnetic disk in the HDD.

FIG. 3 is an enlarged side view schematically showing a magnetic head and a magnetic disk of the HDD.

As shown, the magnetic disk 18 includes the substrate 101 formed into a disk shape of a nonmagnetic material. On each of the upper surface and the lower surface of the substrate 101, a soft magnetic layer 102 as an undercoating layer, and a magnetic recording layer 103 and a protection film 104 as upper layers are stacked in the order. The magnetic disk 18 is rotated at a predetermined speed in a direction indicated by arrow B by the spindle motor 19.

Each HGA 30 of the actuator assembly 22 includes a load beam 26 extending out from the respective arm 32, a flexure 28 disposed on the load beam 26 and the arm 32 and a magnetic head 17 mounted on a gimbal portion 41 of the flexure 28. The tab 35 extends from the distal end of the load beam 26.

The magnetic head 17 is configured as a flying head and comprises a rectangular parallelepiped slider 42 and a head portion 43 formed in a flow-out-side end portion of the slider 42. The slider 42 is formed of, for example, a sintered body of alumina and titanium carbide (AlTiC) and the head portion 43 is formed of several layers of thin films, to constitute write elements and read elements. The head portion 43 is electrically connected to a head IC and the controller (printed circuit board 27) via the wirings of the flexure 28.

The slider 15 comprises a substantially rectangular disk facing surface (ABS) SA opposing the surface of the magnetic disk 18. The magnetic head 17 is maintained in a state where it is flying above the surface of the magnetic disk 18 by a predetermined amount by air stream C produced between the surface of the disk and the disk facing surface SA by rotation of the magnetic disk 18.

Figure 4:
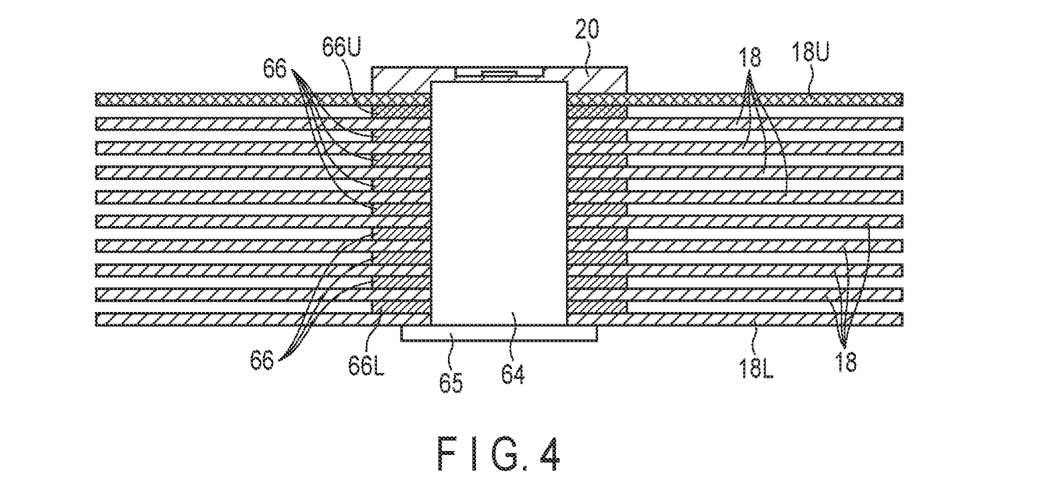
FIG. 4 is a cross-sectional view schematically showing magnetic disks and a spindle motor in the HDD.

FIG. 4 is a schematic cross-sectional view showing the magnetic disk and the spindle motor in the HDD.

As compared to the intermediate magnetic disks 18 widely held by the spacer rings 66 from both top and bottom sides, the uppermost and lowermost magnetic disks 18 (the magnetic disk closest to the top cover and the magnetic disk closest to the base bottom wall), whose one side is pressed by the clamp spring 20 or the flange 65 of the hub may have greater impact amplitude when an impact is applied to the HDD. Under these circumstances, the intermediate magnetic disks 18 employ the aluminum-made substrate 101, whereas at least one of the uppermost and lowermost magnetic disks 18 uses a substrate 101 formed of a material different from that of the intermediate magnetic disks 18, that is, formed of a highly rigid material.

As shown in FIG. 4, according to this embodiment, the uppermost magnetic disk 18U uses a substrate 101 formed from a material having a rigidity higher than that of aluminum, that is, for example, glass. For example, for the glass substrate, a material having a Young's modulus 15% or higher than that of the aluminum substrate and a density less than that of the aluminum substrate is used. The other magnetic disks 18 use the substrate 101 formed of aluminum.

If the substrates 101 are different from each other in material, there may be cases where the amount of eccentricity of the magnetic disk 18 increases due to a difference in thermal expansion coefficient between the magnetic disk and the adjacent spacer ring 66 or the clamp spring 20. Therefore, according to this embodiment, the other spacer rings 66 are formed of aluminum, whereas the uppermost spacer ring 66U and clamp spring 20, in contact to the uppermost magnetic disk 18U are formed of a material different from that of the other spacer rings 66, that is, more specifically a material having a thermal expansion coefficient intermediate between those of aluminum and glass. Some of usable examples of such a material are stainless steel-based, titanium-based and glass-based materials.

As described above, according to the first embodiment, the uppermost magnetic disk 18U is formed from a magnetic disk using a highly rigid glass substrate, and thus the vibration of the magnetic disk when the HDD was shocked is reduced, thus making it possible to improve the impact resistance of the HDD. At the same time, with use of the spacer ring 66U and the clamp spring 20 formed of a material having a less difference in thermal expansion coefficient as compared to that of the glass substrate, it is possible to inhibit the increase in the amount of eccentricity of the uppermost magnetic disk 18U. Note that, of the spacer ring 66U and the clamp spring 20, it suffices if at least the spacer ring 66U is formed of the above-discussed material with low thermal expansion coefficient, and the clamp spring 20 may be formed of aluminum.

As described above, according to the first embodiment, a magnetic disk device with improved impact resistance can be provided.

Next, a structure of a magnetic disk of an HDD according to another embodiment will be described. In the other embodiments to be described below, portions equivalent to those of the first embodiment are denoted by the same reference numbers and detailed explanation thereof is omitted, and such explanation will be mainly given to portions different from those of the first embodiment.

Second Embodiment

Figure 5:
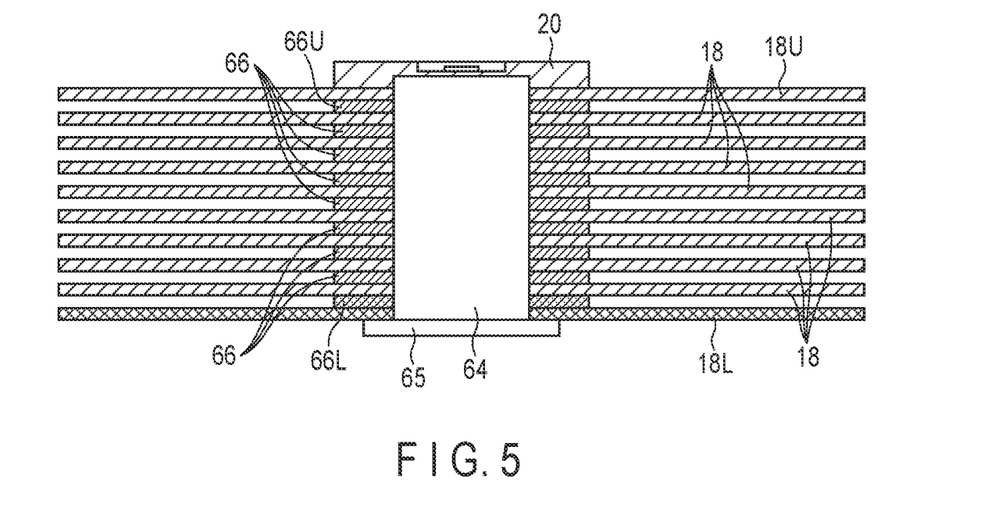
FIG. 5 is a cross-sectional view schematically showing magnetic disks and a spindle motor in an HDD according to a second embodiment.

FIG. 5 is a schematic cross-sectional view of magnetic disks and a spindle motor in a HDD according to a second embodiment.

As shown, according to this embodiment, the lowermost magnetic disk 18L uses a substrate 101 formed of a material having a rigidity higher than that of aluminum, that is, for example, glass. For example, for the glass substrate, a material having a Young's modulus 15% or higher than that of the aluminum substrate and a density less than that of the aluminum substrate is used. The other magnetic disks 18 use a substrate 101 formed of aluminum.

The other spacer rings 66 are formed of aluminum, whereas a lowermost spacer ring 66L and hub 64 (at least the flange 65), in contact to the lowermost magnetic disk 18L are formed of a material different from that of the other spacer rings 66, that is, more specifically a material having a thermal expansion coefficient intermediate between those of aluminum and glass. Some of usable examples of such a material are stainless steel-based, titanium-based and glass-based materials.

According to the second embodiment, the lowermost magnetic disk 18L is formed from a magnetic disk using a highly rigid glass substrate, and thus the vibration of the magnetic disk when the HDD was shocked is reduced, thus making it possible to improve the impact resistance of the HDD. At the same time, with use of the spacer ring 66L and the flange 65 formed of a material having a less difference in thermal expansion coefficient as compared to that of the glass substrate, it is possible to inhibit the increase in the amount of eccentricity of the lowermost magnetic disk 18L.

Note that, of the spacer ring 66U and the flange 65, it suffices if at least the spacer ring 66L is formed of the above-discussed material with low thermal expansion coefficient, and the flange 65 and the hub may be formed of aluminum.

As described above, according to the second embodiment, a magnetic disk device with improved impact resistance can be provided.

Third Embodiment

Figure 6:
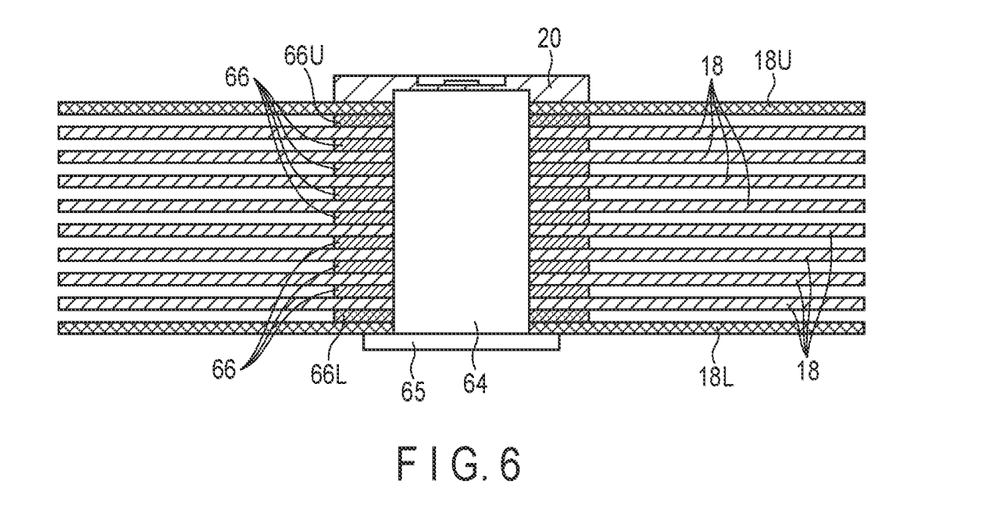
FIG. 6 is a cross-sectional view schematically showing magnetic disks and a spindle motor in an HDD according to a third embodiment.

FIG. 6 is a schematic cross-sectional view of magnetic disks and a spindle motor in a HDD according to a third embodiment.

As shown, according to this embodiment, an uppermost magnetic disk 18U and a lowermost magnetic disk 18L use a substrate 101 formed of a material having a rigidity higher than that of aluminum, that is, for example, glass. For example, for the glass substrate, a material having a Young's modulus 15% or higher than that of the aluminum substrate and a density less than that of the aluminum substrate is used. The other intermediate magnetic disks 18 use a substrate 101 formed of aluminum.

The other intermediate spacer rings 66 are formed of aluminum, whereas an uppermost spacer ring 66U and cramp spring 20, in contact with the uppermost magnetic disk 18U, and a lowermost spacer ring 66L and hub 64 (at least the flange 65), in contact with the lowermost magnetic disk 18L are each formed of a material having a thermal expansion coefficient intermediate between those of aluminum and glass. Some of usable examples of such a material are stainless steel-based, titanium-based and glass-based materials.

As described above, according to the third embodiment, the uppermost magnetic disk 18U and the lowermost magnetic disk 18L are each formed from a magnetic disk using a highly rigid glass substrate, and thus the vibration of the magnetic disk when the HDD was shocked is reduced, thus making it possible to improve the impact resistance of the HDD.

The HDD according to this embodiment was subjected to a drop impact test, to compare with a HDD according to a comparative example which uses magnetic disks all use an aluminum substrate. The HDDs were dropped in a condition where 50 to 70G were applied, and after the impact, the surfaces of all the magnetic disks were subjected to write/read test, to compare them each other as to how much impact the HDD could stand. The results indicated that the HDD which used the magnetic disks all made from the aluminum substrate exhibited to be defective (NG) in the write/read test under the 60G-applied condition, whereas the HDD which used the glass substrate for the uppermost and lowermost magnetic disks passed the test in the 60G-applied condition, thus confirming the improvement in impact resistance.

Further, according to this embodiment, with use of the spacer rings 66U and 66L, the clamp spring 20 and the flange 65 formed of a material having a less difference in thermal expansion coefficient as compared to that of the glass substrate, it is possible to inhibit the increase in the amount of eccentricity of each of the uppermost magnetic disk 18U and the lowermost magnetic disk 18L. Note that, of the spacer rings 66U and 66L, the clamp spring 20 and the flange 65, it suffices if at least the spacer rings 66U and 66L are formed of the above-discussed material with low thermal expansion coefficient, and the spacer rings 66 and the flange 65 may be formed of aluminum.

With the third embodiment, a magnetic disk device with improved impact resistance can be provided.

Figure 7:
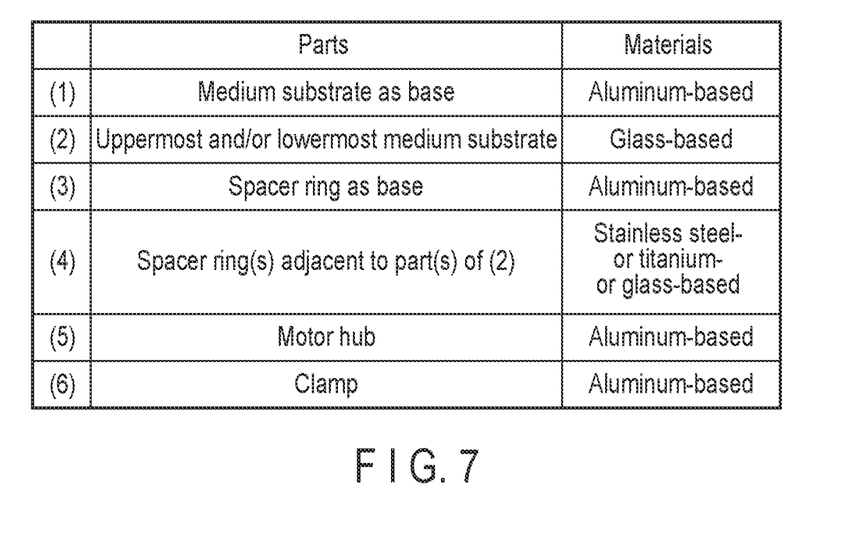
FIG. 7 is a diagram showing a first example of combinations of materials to form various structural elements in the first, second and third embodiments.

FIG. 7 is a diagram showing a first example of combinations of materials to form various structural elements in the first, second and third embodiments discussed above.

According to the first example, in a HDD comprising an aluminum-based motor hub 64, an aluminum-based clamp spring 20 and magnetic disks 18 which use an aluminum substrate, the glass substrate was used only in both or either one of the uppermost magnetic disk 18U and the lowermost magnetic disk 18L. For the glass substrate, a material having a Young's modulus 15% or higher than that of the aluminum substrate and a density less than that of the aluminum substrate was used. An aluminum-based material was used for the intermediate spacer rings 66, and a stainless steel-based, titanium-based or glass-based material having a thermal expansion coefficient different from that of aluminum was used for both or either one of the uppermost and lowermost spacer rings 66U and 66L located adjacent to the glass substrate.

Figure 8:
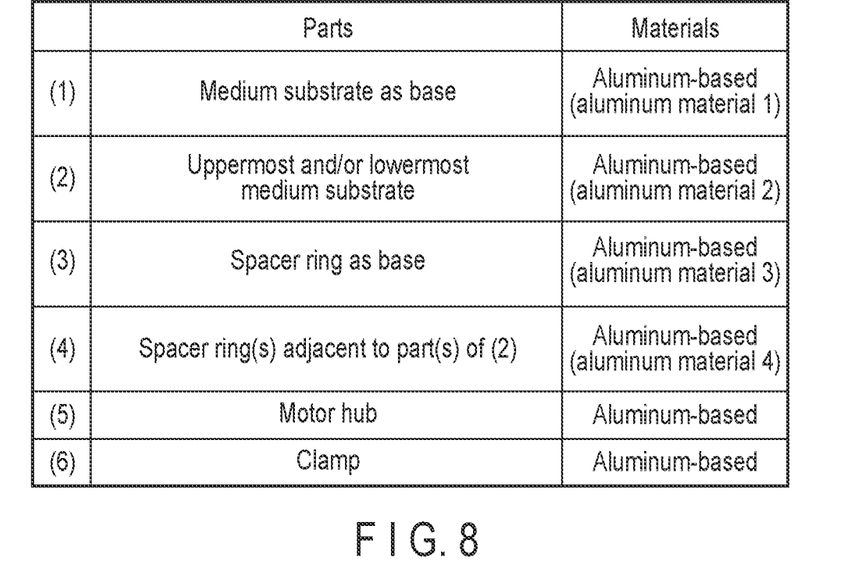
FIG. 8 is a diagram showing a second example of combinations of materials to form various structural elements in the first, second and third embodiments.

FIG. 8 is a diagram showing a second example of combinations of materials to form various structural elements in the first, second and third embodiments discussed above.

According to the second example, in a HDD comprising an aluminum-based motor hub 64, an aluminum-based clamp spring 20 and magnetic disks 18 which use an aluminum substrate (aluminum material 1), an aluminum substrate (aluminum material 2) of a different material was used only in both or either one of the uppermost and lowermost magnetic disks 18U and 18L. For the aluminum substrate (aluminum material 2), a material having a Young's modulus 8% or higher than that of the aluminum substrate (aluminum material 1) and a difference in density less than 5% as compared to the aluminum substrate was used. For the intermediate spacer rings 66, an aluminum substrate (aluminum material 3) was used, and for both or either one of the uppermost and lowermost spacer rings 66U and 66L, in contact with the respective magnetic disks 18U and 18L of the aluminum substrate (aluminum material 2), an aluminum substrate (aluminum material 4) having a thermal expansion coefficient different from that of the aluminum material 3 was used.

Figure 9:
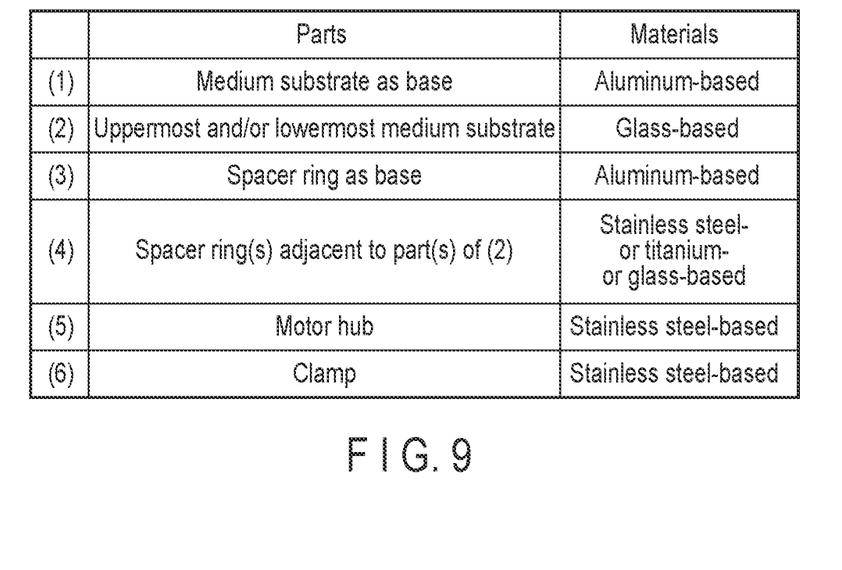
FIG. 9 is a diagram showing a fourth example of combinations of materials to form various structural elements in the first, second and third embodiments.

FIG. 9 is a diagram showing a third example of combinations of materials to form various structural elements in the first, second and third embodiments discussed above.

According to the third example, in a HDD comprising a stainless steel-based motor hub 64, a stainless steel-based clamp spring 20 and magnetic disks 18 which use an aluminum substrate, the glass substrate was used only in both or either one of the uppermost and lowermost magnetic disks 18U and 18L. For the glass substrate, a material having a Young's modulus 15% or higher than that of the aluminum substrate and a density less than that of the aluminum substrate was used. An aluminum-based material was used for the intermediate spacer rings 66, and a stainless steel-based, titanium-based or glass-based material having a thermal expansion coefficient different from that of aluminum was used for both or either one of the uppermost and lowermost spacer rings 66U and 66L located adjacent to the magnetic disks 18U and 18L of the glass substrate.

Figure 10:
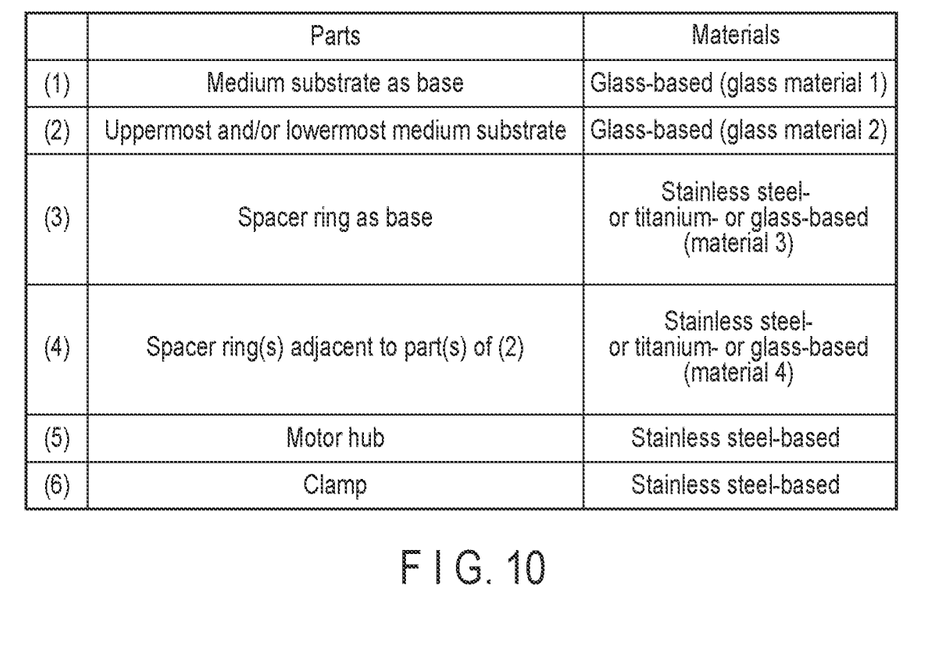
FIG. 10 is a diagram showing a fourth example of combinations of materials to form various structural elements.

FIG. 10 is a diagram showing a fourth example of combinations of materials to form various structural elements.

According to the fourth example, in a HDD comprising a stainless steel-based motor hub 64, a stainless steel-based clamp spring 20 and magnetic disks 18 of a glass substrate (glass material 1), a glass substrate (glass material 2) of a different material was used only in both or either one of the uppermost and lower most magnetic disks 18U and 18L. For the glass substrate (glass material 2), a material having a Young's modulus 8% or higher than that of the glass substrate (glass material 1) and a difference in density less than 5% as compared to the glass substrate was used. For the intermediate spacer rings 66, a stainless steel-based, titanium-based or glass-based material (material 3) was used, and for both or either one of the uppermost and lowermost spacer rings 66U and 66L, in contact with the respective magnetic disks 18U and 18L of the glass substrate (glass material 2), a stainless steel-based, titanium-based or glass-based material (material 4) having a thermal expansion coefficient different from that of the material 3 was used.

In any of the combinations discussed in the first to fourth examples, advantageous effects similar to those of the first to third embodiments described above can be obtained.

Fourth Embodiment

According to a fourth embodiment, in a HDD containing a plurality of, for example, ten magnetic disks 18 which use an aluminum substrate or a glass substrate, both or either one of magnetic disks 18U and 18L are made from a substrate having a thickness different from that of the substrates of the other magnetic disks 18. For example, the substrates of the uppermost and lowermost magnetic disks 18U and 18L are 20 to 30% thicker than those of the other magnetic disks 18. For example, the thickness of the intermediate magnetic disks 18 is set to 0.5 mm, whereas the thickness of the uppermost and lowermost magnetic disk 18U and 18L is set to 0.635 mm. For the material for each component, any of the first to fourth example may be applied. All of the magnetic disks may be aluminum substrates, or all of the magnetic disks may be glass substrates.

As described above, when the thickness of the substrates of both or either one of the uppermost and lowermost magnetic disks 18U and 18L is increased, the rigidity of the magnetic disks 18U and 18L is enhanced, thereby reducing the vibration of the magnetic disks when the HDD is subjected to an impact. Thus, the impact resistance of the HDD can be improved.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

For example, the number of magnetic disks installed is not limited to ten, but nine or less, or it may be increased to eleven or twelve. The materials for forming each component are not limited to those of the embodiments or examples discussed above, but they may be selected as needed or changed.

What is claimed is:

1. A disk device comprising:
a housing including a bottom wall and a cover opposing the bottom wall;
a plurality of magnetic recording media disposed in the housing in a multi-layered manner to be coaxial with each other with intervals therebetween; and
a plurality of spacer rings, one of the spacer rings being disposed between each adjacent pair of the plurality of magnetic recording media,
at least one of an uppermost magnetic recording medium adjacent to the cover and a lowermost magnetic recording medium adjacent to the bottom wall comprising a substrate having a rigidity higher than that of substrates of the other magnetic recording media, and
one or more of the plurality of spacer rings being in contact with the magnetic recording media comprising the substrate having the higher rigidity, and having a thermal expansion coefficient different from a thermal expansion coefficient of the other spacer rings.

2. The disk device of claim 1, wherein
the uppermost magnetic recording medium and the lowermost magnetic recording medium comprise the substrate having the rigidity higher than that of the substrates of the other magnetic recording media, and the spacer ring in contact with the uppermost magnetic recording medium and the spacer ring in contact with the lowermost magnetic recording medium have the thermal expansion coefficient different from the thermal expansion coefficient of the other spacer rings.

3. The disk device of claim 1, wherein
the one or more substrates having the higher rigidity is formed of a material different from a material of the substrates of the other magnetic recording media.

4. The disk device of claim 3, wherein
the thermal expansion coefficient of the one or more spacer rings brought into contact with the magnetic recording media comprising the substrate having the higher rigidity, is intermediate between a thermal expansion coefficient of the one or more substrates having the higher rigidity and a thermal expansion coefficient of the substrates of the other magnetic recording media.

5. The disk device of claim 4, wherein
the one or more substrates having the higher rigidity is formed from glass, and the substrates of the other magnetic recording media are each formed from aluminum.

6. The disk device of claim 3, wherein
a thickness of the one or more substrates having the higher rigidity is greater than a thickness of the substrates of the other magnetic recording media.

7. The disk device of claim 1, wherein
a thickness of the one or more substrates having the higher rigidity is greater than a thickness of the substrates of the other magnetic recording media.

8. The disk device of claim 1, further comprising:
a spindle motor provided on the bottom wall and including a rotatable hub engaged with the plurality of magnetic recording media and the plurality of spacer rings, an annular flange being provided at an end portion of the hub on a side of the bottom wall on which the lowermost magnetic recording medium is placed; and
a clamp spring fixed to an end of the hub on a side of the cover and pressing the uppermost magnetic recording medium,
wherein
at least one of the clamp spring and the flange has a thermal expansion coefficient different from the thermal expansion coefficient of the other spacer rings.

9. The disk device of claim 1, further comprising:
a spindle motor provided on the bottom wall and including a rotatable hub engaged with the plurality of magnetic recording media and the plurality of spacer rings, an annular flange being provided at an end portion of the hub on a side of the bottom wall on which the lowermost magnetic recording medium is placed; and
a clamp spring fixed to an end of the hub on a side of the cover and pressing the uppermost magnetic recording medium,
wherein
the clamp spring and the flange have a thermal expansion coefficient different from the thermal expansion coefficient of the other spacer rings.

* * * * *